(12) United States Patent
Knierim

(10) Patent No.: US 12,488,114 B2
(45) Date of Patent: Dec. 2, 2025

(54) ANALYSIS OF A CONTAINER INSTANCE OF AN OPERATING SYSTEM

(71) Applicant: Siemens Aktiengesellschaft, Munich (DE)

(72) Inventor: Christian Knierim, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 540 days.

(21) Appl. No.: 17/801,303

(22) PCT Filed: Jan. 21, 2021

(86) PCT No.: PCT/EP2021/051262
§ 371 (c)(1),
(2) Date: Aug. 22, 2022

(87) PCT Pub. No.: WO2021/170316
PCT Pub. Date: Sep. 2, 2021

(65) Prior Publication Data
US 2023/0090689 A1 Mar. 23, 2023

(30) Foreign Application Priority Data
Feb. 25, 2020 (EP) .................................. 20159204

(51) Int. Cl.
*G06F 21/57* (2013.01)
(52) U.S. Cl.
CPC ...... *G06F 21/577* (2013.01); *G06F 2221/034* (2013.01)

(58) Field of Classification Search
CPC ... G06F 21/577; G06F 21/53; G06F 2221/034
See application file for complete search history.

(56) References Cited

U.S. PATENT DOCUMENTS

| 2012/0072968 | A1 | 3/2012 | Wysopal | 726/1 |
| 2012/0311344 | A1 | 12/2012 | Sabin | 713/189 |
| 2015/0143527 | A1 | 5/2015 | Brandwine | H04L 29/06 |

(Continued)

OTHER PUBLICATIONS

Search Report for International Application No. PCT/EP2021/051262, 13 pages, Apr. 23, 2021.

(Continued)

*Primary Examiner* — David J Pearson
(74) *Attorney, Agent, or Firm* — Slayden Grubert Beard PLLC

(57) ABSTRACT

Various embodiments include an automated method for analyzing a container instance running on a host system in a runtime environment. The method may include: capturing an initial reference picture including a reproduction of the container instance; transferring the picture to a test system; capturing data when triggered by an event relating to an operation on the container instance; transmitting the data to the test system; producing an updated reference picture of the container instance by adjusting the initial reference picture for effects that the operations have on the container instance, the effects expected effects that the operations cause as expected; and analyzing the updated reference picture using the test system.

12 Claims, 2 Drawing Sheets

(56) References Cited

U.S. PATENT DOCUMENTS

| | | | | |
|---|---|---|---|---|
| 2016/0197765 A1* | 7/2016 | Brown | ................. | H04L 41/069 709/217 |
| 2018/0293374 A1* | 10/2018 | Chen | ................... | G06F 9/45558 |
| 2019/0065323 A1* | 2/2019 | Dhamdhere | ........ | G06F 11/1484 |
| 2019/0108340 A1* | 4/2019 | Bedhapudi | ............ | G06F 21/554 |
| 2020/0159933 A1* | 5/2020 | Ciano | ................... | G06F 21/577 |
| 2020/0356442 A1* | 11/2020 | Agarwal | ............. | G06F 11/1469 |
| 2021/0012000 A1* | 1/2021 | Halcrow | ............... | G06F 21/554 |
| 2021/0117549 A1* | 4/2021 | Mandagere | ......... | G06F 11/1446 |
| 2023/0169183 A1* | 6/2023 | Wu | .................... | G06F 11/1451 726/25 |

OTHER PUBLICATIONS

Search Report for EP Application No. 20159204.5, 9 pages, Aug. 20, 2020.

* cited by examiner

ANALYSIS OF A CONTAINER INSTANCE OF AN OPERATING SYSTEM

CROSS-REFERENCE TO RELATED APPLICATIONS

This application is a U.S. National Stage Application of International Application No. PCT/EP2021/051262 filed Jan. 21, 2021, which designates the United States of America, and claims priority to EP Application No. 20159204.5 filed Feb. 25, 2020, the contents of which are hereby incorporated by reference in their entirety.

TECHNICAL FIELD

The present disclosure relates to operating systems. Various embodiments of the teachings herein may include automated methods and/or systems for analyzing a container instance of an operating system.

BACKGROUND

Since industrial systems (control units, industrial PCs, IoT and Edge devices, cloud servers) are often used over a long period (10-20 years, in some cases even 30 or 40 years) in the field, they are subject to constantly changing prerequisites and a dynamic environment. In order to deal with these circumstances, new devices are first and foremost developed so that they may be flexibly adapted over the period of use. This can be achieved e.g. with the assistance of downloadable applications by means of container virtualization and/or container technologies.

Container virtualization (or: containerization) is a method for operating multiple instances (e.g. application programs), the container instances, of an operating system (as what are known as "guests" or clients) in isolation from one another on a host system/host computer. Containerization allows the resources used on the host system/host computer to be separated and managed. As such, it is possible to manage which system resources are allocated to the processes in which container instance.

The host system or host computer refers to a computer, with associated operating system, that is integrated in a computer network and serves clients (e.g. container instances) or accommodates servers (that is to say provides services). Container instances may be operated on different runtime environments.

A runtime environment or execution environment is generally an application framework or a library that provides executable applications/application programs, such as for example apps, components, web pages, with the functionality needed for their execution at runtime. A runtime environment allows applications/application programs to be rendered executable in "unfamiliar" surroundings as a result of the runtime environment mediating between the application program and the operating system.

Operating systems today are of very complex design. If applications are supposed to run as quickly and easily as possible under multiple operating systems, it is advisable to implement dedicated small "operating systems" for these applications as runtime environments. This saves the effort of adapting each individual application to suit the respective operating system separately.

A runtime environment loads the applicable application and executes it on its platform, for which the runtime environment was ultimately created. That is to say: in this way the runtime environment itself becomes a small "platform" on which the programs/applications may be based.

Container instances started on runtime environments may contain vulnerabilities that need to be identified and rectified in good time so that they cannot be exploited by attackers. To identify vulnerabilities, the images of the container instance (pictures/reproductions of the container instance, which may also be referred to as container images) or the running container instances are scanned.

A distinction may be drawn between two cases here:

Case 1: identification of vulnerabilities in the container image (picture of the container instance) by way of a periodic scan of the registry. This involves container images being regularly scanned. This has the disadvantage that the started container instance is not examined and thus changes that arise on the container instance during runtime cannot be taken into consideration/identified.

Case 2: identification of vulnerabilities in started container instances on the runtime environment. This may firstly be performed using privileged container instances, which are provided by security manufacturers and regularly examine the container instances on the runtime environment. This has the disadvantage that a privileged container instance needs to be provided. This also has the disadvantage that the optimum times for the examination are not known by the privileged container instance and thus examinations possibly take place too often or too infrequently and, as such, vulnerabilities cannot be identified in good time.

Moreover, there is the possibility of scanning container images on the runtime environment and having them checked by a monitoring unit. This has the disadvantage that a scan and a check are performed only when new container instances are (re)started and there is no provision for regular scanning intervals.

SUMMARY

The teachings of the present disclosure provide improved solutions for analyzing and testing started/running container instances, in particular in order to increase security in respect of undesirable operations on the container instance. For example, some embodiments include an automated method for analyzing a container instance (3) of an operating system of a host system (2), the container instance (3) having been started on a runtime environment, comprising: capturing an initial reference picture (S1) of the container instance (3), the initial reference picture being a reproduction of the container instance (3), transferring the initial reference picture (S2) to a test system (4), capturing data (S3), the capture being performed when triggered by the occurrence of an event and the event and the data relating to an operation on the container instance (3), the operation being an operation that has actually taken place and the data characterizing the operation, transmitting the data (S4) to the test system (4), the test system (4) being arranged outside the host system (2), producing an updated reference picture (S5) of the container instance (3), the updated reference picture being produced by adjusting the initial reference picture for effects that the operations have on the container instance (3), the effects being expected effects that the operations cause as expected, and analyzing the updated reference picture (S6) by way of the test system (4).

In some embodiments, the initial reference picture (S1) of the container instance (3) is captured by way of a request on the operating system.

In some embodiments, the event and/or the operation comprises a write operation on the container instance (3).

In some embodiments, the event and the operation are different.

In some embodiments, the time of the transmission of the data (S4) to the test system (4) is stipulated as being at an interval of time after the occurrence of the event.

In some embodiments, the time of the transmission of the data (S4) is stipulated independently of the time of the event.

In some embodiments, the time of the transmission of the data (S4) is stipulated on the basis of an available storage capacity of a storage unit (10) provided for the data.

In some embodiments, the transmission of the data (S4) to the test system (4) is performable in integrity-assured fashion.

In some embodiments, the analysis of the updated reference picture (S6) is geared to identifying vulnerabilities of the container instance (3).

In some embodiments, depending on an input parameter, an operation that constitutes adding an additional file system to the container instance (3) is ignored when producing the updated reference picture (S1) of the container instance (3).

In some embodiments, the data are buffer-stored before being transmitted (S4) to the test system (4).

As another example, some embodiments include a system (1) comprising: a container instance (3) of an operating system of a host system (2), the container instance (3) having been started on a runtime environment, a test system (4), the test system (4) being arranged outside the host system (2), a first capture unit (5), the first capture unit (5) being designed to be able to capture an initial reference picture of the container instance (3), the initial reference picture being a reproduction of the container instance (3), a transfer unit (6), the transfer unit (6) being designed to be able to transfer the initial reference picture to a test system (4), a second capture unit (7), the second capture unit (7) being designed to be able to capture data when triggered by the occurrence of an event, the event and the data relating to an operation on the container instance (3), the operation being an operation that has actually taken place and the data characterizing the operation, a transmission unit (8), the transmission unit (8) being designed to be able to transmit the data to the test system (4), and an update unit (9), the update unit (9) being designed to be able to produce an updated reference picture of the container instance (3), the updated reference picture being able to be produced by adjusting the initial reference picture for effects that the operation has on the container instance (3), the effects being expected effects that the operations cause as expected, and the test system (4) moreover being designed to be able to analyze the updated reference picture.

In some embodiments, the system (1) is able to perform one or more of the methods as described herein.

BRIEF DESCRIPTION OF THE DRAWINGS

The features and advantages of the teachings of the present disclosure are apparent from the below explanations of multiple embodiments with reference to schematic drawings, in which.

DETAILED DESCRIPTION

Figure 1:
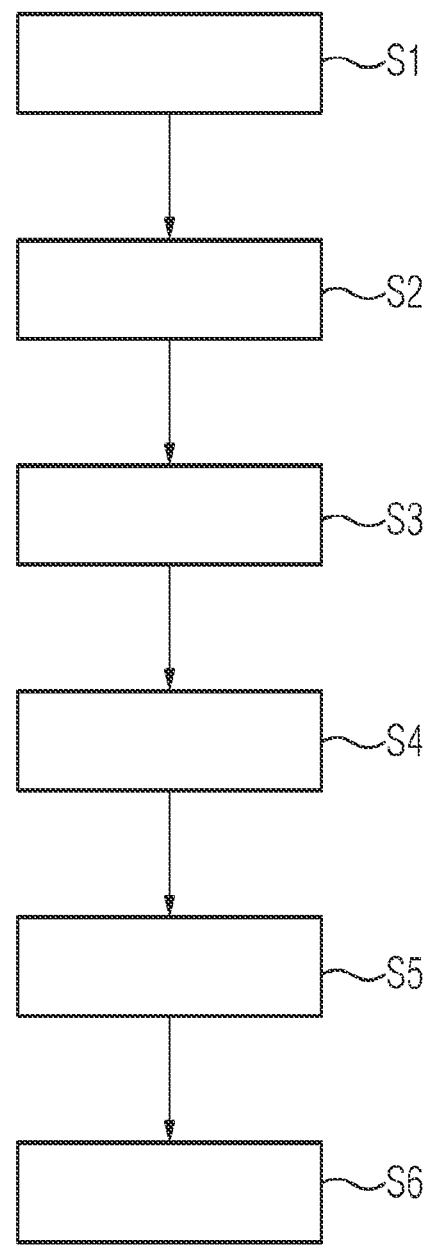
FIG. 1 shows a flowchart for a method incorporating teachings of the present disclosure.

The present disclosure describes automated methods for analyzing a container instance of an operating system of a host system, the container instance having been started on a runtime environment, comprising: capturing an initial reference picture of the container instance, the initial reference picture being a reproduction of the container instance, transferring the initial reference picture to a test system, the test system (4) being arranged outside the host system (2), capturing data, the capture being performed when triggered by the occurrence of an event and the event and the data relating to operations on the container instance, the operation being an operation that has actually taken place and the data characterizing the operation, transmitting the data to the test system, producing an updated reference picture of the container instance, the updated reference picture being produced by adjusting the initial reference picture for effects that the operations have on the container instance, the effects being expected effects that the operations cause as expected, and analyzing the updated reference picture by way of the test system.

In some embodiments, the analysis of the container image of the container instance, or of the updated reference picture of the container instance, is performed in event-based fashion, i.e. when triggered by the prior occurrence of an event relating to operations on the container instance.

Within the context of this disclosure, container instance is understood to mean an isolated instance of an underlying operating system, said instance being operated in isolation from other instances on a host system/host computer and running in the same process space as the operating system itself. Container instances are managed separately by themselves and are separately allocated system resources of the underlying operating system. The isolation of the container instance from other instances is achieved using onboard means of the underlying operating system.

Within the context of this disclosure, a runtime environment is understood to mean an application framework, i.e. the available and stipulated prerequisites of the runtime system, that provides container instances with the functionality needed for their execution at runtime. The container instance's having been started means that the container instance is running or is in runtime. The container instance has been started in a runtime environment, or is running in a runtime environment.

The reference picture is a reproduction of the container instance and may also be referred to as a clone of the container instance. The analysis of the updated reference picture by way of the test system may also be referred to as checking or testing of the present state of the container instance.

The effects being expected effects that the operations cause as expected means that they are not actual effects, but rather effects that are a known result for a specific operation, in particular if the system is running correctly. The updated reference picture is therefore not a reproduction of reality, but rather a reference picture that is to be expected on the basis of the operations.

Statements about vulnerabilities of container instances that are running may be made by virtue of a container image stored in a registry/register being used as initial reference picture of the container instance when the container instance starts and continually being compared against the running container instance. This may initially be performed using an image ID (identification of the container image) of the initial container image and the instance ID (identification of the container instance), which may continually be requested on the host system (e.g. using onboard means, i.e. using dedicated means of the container instance runtime environment or security tools).

During the runtime of the container instance, operations on the container instance may result in changes. The changes may arise on a file system of the container instance, for example, and as a result of operations such as reinstalling software or other write operations, for example. When an event that relates to an operation on the container instance data, or an event that is an operation on the container instance, occurs, it is therefore necessary to concomitantly log/to capture all relevant data for this operation on the container instance. The data subsequently need to be transmitted to a test system, for example when a further/other event occurs and/or at a defined time.

A transmission to the test system that is intended to check the container instance may be carried out in integrity-assured fashion, for example, i.e. while preventing unauthorized modification of information and data. An integrity-assured transmission to the test system may be carried out using MTLS (Mutual Transport Layer Security), for example.

The test system is then intended to update the initial reference picture on the basis of the operations on the container instance, i.e. on the basis of the data, and to produce an updated reference picture. This provides an updated reference picture. The test system subsequently analyzes and checks the updated reference picture, for example for vulnerabilities.

Operations on the container instance along with the content are captured in the form of data when an event occurs and may be read in event-based fashion (i.e. directly at the time of the event), for example using eBPF (extended Berklee Packet Filter) probes or programs based thereon on the underlying host system, and transmitted/transferred to the test system that is supposed to check/analyze the updated reference picture. Alternatively, the data may be read and transmitted/transferred to the test system at a later time.

The check on the running container instance is therefore performed by applying the operations that have been ascertained—as described above—, or data relating to the operations, to the initial reference picture of the container instance, producing an updated reference picture of the container instance and performing an analysis, for example a vulnerability scan, of the updated reference picture.

Container instances that are running may therefore be scanned/analyzed in event-based fashion when triggered by the occurrence of an event (e.g. using a defined trigger or a defined change operation) and do not need to be scanned/analyzed (only) over fixed intervals. This has the advantage that vulnerabilities can be identified more quickly and are not first identified at a next fixed time in an interval.

The test system is arranged outside the host system on which the container instance is operated. A test system outside the container instance and outside the host system has the advantage that there is no need for an agent/test system in the container instance on the runtime environment. This has the advantage that the analysis/check by way of the test system does not take place on the host system itself and therefore no resources are required, or consumed, there.

The use of a test system outside the host system moreover has the advantage that the analysis of the updated reference picture and possible identification of vulnerabilities of the container instance require no privileged test instances on the runtime system/in the runtime environment that check further container instances. This has the advantage that the test system may be managed independently of the operating system/host system and the container instance. Moreover, it has the advantage that malware smuggled into the container instance cannot be used for compromise.

In some embodiments, the initial reference picture of the container instance is captured by way of a request on the operating system, for example using onboard means (i.e. using dedicated means) of the container instance runtime environment and/or security tools. This has the advantage that an initial reference picture of the container instance is provided.

Later changes on the container instance, for example as a result of operations on the container instance, including the content, are captured in the form of data when an event occurs and may be read in event-based fashion (i.e. directly at the time of the event), for example using eBPF (extended Berklee Packet Filter) probes or programs based thereon on the underlying host system, and transmitted/transferred to the test system that is supposed to check/analyze the updated reference picture.

In some embodiments, the event and/or the operation comprises a write operation on the container instance.

In some embodiments, the event and/or the operation comprise changes on the container instance, changes to a file system of the container instance, system calls, modifications and/or creation of files and/or directories, installation processes on the container instance, changes to permissions on the container instance and/or changes to files on the container instance.

In some embodiments, the event and the operation may be different. Data are therefore captured when an event occurs, and the data relate to an operation on the container instance, the event for which data are captured and the operation to which the data relate being able to be produced in the same way or differently. As such, for example a specific write operation on the container instance may be the initiating event for which the capture of data takes place, and at the same time the data may relate to the specific write operation. Alternatively, an initiating event may result in data being collected that relate to a different operation on the container instance than the operation to which the data relate.

In some embodiments, the time of the transmission of the data to the test system is stipulated as being not directly after the capture of the data, but rather at an interval of time after the occurrence of the event. By way of example, the defined time may be stipulated on the basis of a definable cyclic time and/or may be stipulated on the basis of available storage capacities of a storage unit provided for the data.

For example after a specific storage volume/storage capacity has been used (defined time), it is therefore possible to perform a transmission of the data to the test system at the next stipulated cyclic time in a time sequence (for example every 5 minutes).

In some embodiments, the time of the transmission of the data is stipulated independently of the time of the event. The time may be part of a periodic time sequence. As such, the transmission of the data to the test system and the subsequent production of the updated reference picture and the analysis of the updated reference picture may be performed every 5 minutes, for example. In that case, the data are not transmitted to the test system in event-based fashion, but the data continue to be captured in event-based fashion (i.e. when triggered by the occurrence of an event).

In some embodiments, the time of the transmission of the data is stipulated on the basis of an available storage capacity of a storage unit provided for the data. This option is combinable with the aforementioned embodiments of the defined time stipulated on the basis of the occurrence of a definable cyclic time.

In some embodiments, the transmission of the data to the test system is performable in integrity-assured fashion, e.g. using MTLS (Mutual Transport Layer Security).

In some embodiments, the analysis of the updated reference picture is geared to identifying vulnerabilities of the container instance. Identified vulnerabilities of the container instance may subsequently be dealt with and/or eliminated.

In some embodiments, depending on an input parameter, an operation that constitutes adding an additional file system to the container instance is ignored when producing the updated reference picture of the container instance. The input parameter may be provided by way of an input from a user. An additional file system may be provided by way of an additionally connected storage unit, such as a hardware unit or an additionally connected network drive.

In some embodiments, there is increased flexibility for the use of the test system. A reliable test on an additionally connected network drive may have a high level of complexity and therefore be carried out optionally. The additionally connected network drive may be factored in or ignored on the basis of an input from a user or a computed input parameter (for example computed on the basis of efficiency parameters). If it is ignored, the complexity of the analysis by way of the test system may be kept lower.

In some embodiments, the data are buffer-stored before being transmitted to the test system. In addition to direct transmission of the data to the test system, an alternative variant is conceivable in which the data are not transmitted to the test system immediately but rather are buffer-stored on a local buffer store of the underlying host system/operating system and are transmitted to the test system only for example when there is a defined fill level for the local buffer store, an event stored using the guideline described above/occurrence of a definable second event (such as changes on the container instance, changes to a file system of the container instance, write operations on the container instance, system calls, modifications and/or creation of files and/or directories, installation processes on the container instance, changes to permissions on the container instance and/or changes to files on the container instance) or after an interval has elapsed. Moreover, for example if the test system is not available for multiple intervals, data that have not yet been transmitted to the test system may thus be collected and transmitted collectively at a later time.

In some embodiments, a system includes: a container instance of an operating system of a host system, the container instance having been started on a runtime environment, a test system, the test system (4) being arranged outside the host system (2), a first capture unit, the first capture unit being designed to be able to capture an initial reference picture of the container instance and the initial reference picture being a reproduction of the container instance, a transfer unit, the transfer unit being designed to be able to transfer the initial reference picture to a test system, a second capture unit, the second capture unit being designed to be able to capture data when triggered by the occurrence of an event, the event and the data relating to an operation on the container instance, the operation being an operation that has actually taken place and the data characterizing the operation, a transmission unit, the transmission unit being designed to be able to transmit the data to the test system, and an update unit, the update unit being designed to be able to produce an updated reference picture of the container instance, the updated reference picture being able to be produced by adjusting the initial reference picture for effects that the operation has on the container instance, the effects being expected effects that the operations cause as expected, and the test system able to analyze the updated reference picture.

In some embodiments, the system is able to perform one or more of the methods described herein.

FIG. 1 shows a flowchart for a method for analyzing a container instance (3, see FIG. 2) of an operating system of a host system (2, see FIG. 2), the container instance (3) having been started on a runtime environment. The method shown includes:

step S1: capture an initial reference picture of the container instance (3), the initial reference picture being a reproduction of the container instance (3), step S2: transfer the initial reference picture to a test system (4, see FIG. 2), step S3: capture data, the capture being performed when triggered by the occurrence of an event and the event and the data relating to an operation on the container instance (3), the operation being an operation that has actually taken place and the data characterizing the operation, step S4: transmit the data to the test system (4), the test system (4) being arranged outside the host system (2), step S5: produce an updated reference picture of the container instance (3), the updated reference picture being produced by adjusting the initial reference picture for effects that the operations have on the container instance (3), the effects being expected effects that the operations cause as expected, and step S6: analyze the updated reference picture by way of the test system (4).

Step S1, capture the initial reference picture (S1) of the container instance (3), may be carried out by way of a request on the operating system (2). This may initially be performed using an image ID (identification of the container image) of the initial container image and the instance ID (identification of the container instance), which may continually be requested on the host system (e.g. using onboard means, e.g. using dedicated means of the container instance runtime environment or security tools).

Step S4, transmit the data to the test system (S4), is performable in integrity-assured fashion, e.g. using MTLS (Mutual Transport Layer Security).

Step S6, analyze the updated reference picture (S6), is in particular geared to identifying vulnerabilities of the container instance (3).

Step S5, produce the updated reference picture (S1) of the container instance (3), may comprise, depending on an input parameter, ignoring operations that constitute adding an additional file system to the container instance (3).

The data may be buffer-stored before step S4, transmit (S4) to the test system (4).

Figure 2:
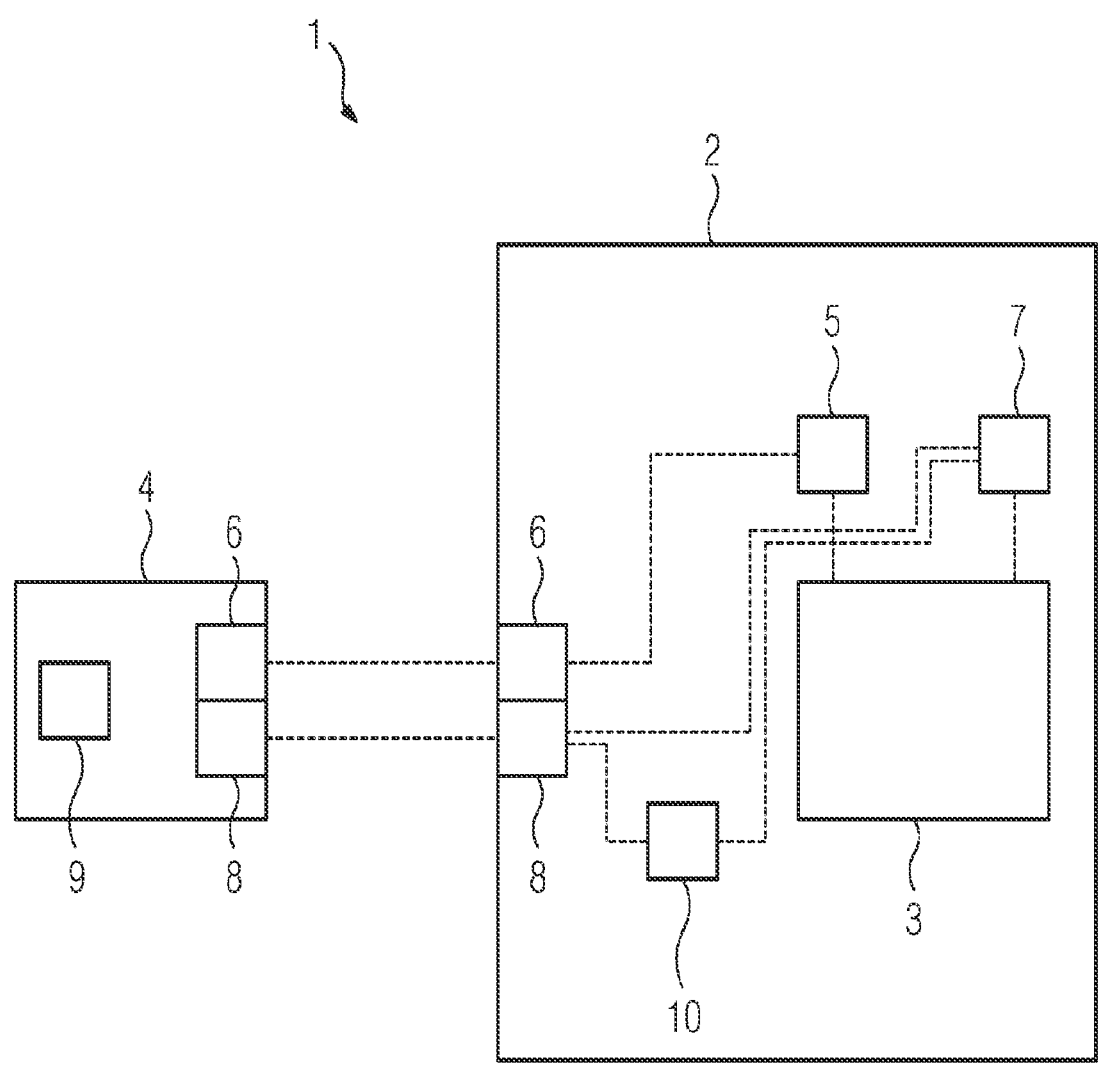
FIG. 2 shows a system incorporating teachings of the present disclosure.

FIG. 2 shows a schematic representation of a system (1) incorporating teachings of the present disclosure. FIG. 2 shows a container instance (3) of an operating system of a host system (2), the container instance (3) having been started on a runtime environment.

FIG. 2 moreover shows a test system (4), the test system (4) moreover being designed to be able to analyze a later-produced updated reference picture and the test system (4) being arranged outside the host system (2).

FIG. 2 moreover shows a first capture unit (5), the first capture unit (5) being designed to capture an initial reference picture of the container instance (3) and the initial reference picture being a reproduction of the container instance (3).

FIG. 2 moreover shows a transfer unit (6), the transfer unit (6) being designed to be able to transfer the initial reference picture to the test system (4).

FIG. 2 moreover shows a second capture unit (7), the second capture unit (7) being designed to be able to capture data when triggered by the occurrence of an event, the event and the data relating to an operation on the container instance (3).

FIG. 2 moreover shows a transmission unit (8), the transmission unit (8) being designed to be able to transmit the data to the test system (4).

FIG. 2 moreover shows an update unit (9), the update unit (9) being designed to be able to produce the updated reference picture of the container instance (3), the updated reference picture being able to be produced by adjusting the initial reference picture for effects that the operation has on the container instance (3), the effects being expected effects that the operations cause as expected.

The test system (4) may be arranged outside the container instance (3) and outside the host system (2).

The event and/or the operations may comprise changes on the container instance (3), changes to a file system of the container instance (3), write operations on the container instance (3), system calls, modifications and/or creation of files and/or directories, installation processes on the container instance (3), changes to permissions on the container instance (3) and/or changes to files on the container instance (3). The event and the operations may be different or the same.

Although the teachings of the present disclosure have been illustrated and described more thoroughly in detail by way of the exemplary embodiments, the scope of the teaching is not restricted by the examples disclosed and other variations may be derived therefrom by a person skilled in the art without departing from the scope of protection of the disclosure.

LIST OF REFERENCE SIGNS 1 system
2 host system
3 container instance
4 test system
5 first capture unit
6 transfer unit
7 second capture unit
8 transmission unit
9 update unit
10 storage unit
S1 capture an initial reference picture
S2 transfer the initial reference picture
S3 capture data
S4 transmit the data
S5 produce an updated reference picture
S6 analyze the updated reference picture

What is claimed is:

1. An automated method for analyzing a container instance of an operating system of a host system, the container instance having been started on a runtime environment, the method comprising:
    capturing an initial reference picture of the container instance, wherein the initial reference picture includes a clone of the container instance;
    transferring the initial reference picture to a test system;
    capturing data when triggered by occurrence of an event, the event and the data relating to an operation on the container instance, wherein the operation has actually taken place and the data characterizes the operation;
    transmitting the data to the test system arranged outside the host system;
    the test system producing an updated reference picture of the container instance, the updated reference picture produced by adjusting the initial reference picture for effects that the operation has on the container instance, the effects including expected effects that are a known result of the operation; and
    analyzing the updated reference picture using the test system.

2. The method as claimed in claim 1, wherein the initial reference picture of the container instance is captured in response to a request on the operating system.

3. The method as claimed in claim 1, wherein the event and/or the operation comprises a write operation on the container instance.

4. The method as claimed in claim 1, wherein the event and the operation are different.

5. The method as claimed in claim 1, wherein a time of transmission of data to the test system is stipulated at an interval of time after occurrence of the event.

6. The method as claimed in claim 5, wherein the time of transmission of the data is stipulated independently of the time of the event.

7. The method as claimed in claim 5, wherein the time of transmission of the data is stipulated on the basis of an available storage capacity of a storage unit provided for the data.

8. The method as claimed in claim 1, wherein the transmission of the data to the test system is performed in integrity-assured fashion.

9. The method as claimed in claim 1, wherein analysis of the updated reference picture identifies vulnerabilities of the container instance.

10. The method as claimed in claim 1, wherein, depending on an input parameter, an operation that constitutes adding an additional file system to the container instance is ignored when producing the updated reference picture of the container instance.

11. The method as claimed in claim 1, wherein the data are buffer-stored before transmission to the test system.

12. A system comprising:
    a container instance of an operating system of a host computer, the container instance having been started on a runtime environment;
    a test system arranged outside the host computer;
    a first capture unit configured to capture an initial reference picture of the container instance, the initial reference picture including a clone of the container instance;
    a transfer unit configured to transfer the initial reference picture from the host computer to the test system;
    a second capture unit configured to capture data when triggered by the occurrence of an event, the event and the data relating to an operation on the container instance, wherein the operation has actually taken place and the data characterizing the operation;
    a transmission unit configured to transmit the data from the host computer to the test system; and
    an update unit on the test system configured to produce an updated reference picture of the container instance, the updated reference picture produced by adjusting the initial reference picture for effects that the operation has on the container instance, the effects including expected effects that are a known result of the operation; and
    the test system configured to analyze the updated reference picture.

* * * * *